United States Patent [19]
Logan

[11] Patent Number: 6,130,827
[45] Date of Patent: Oct. 10, 2000

[54] POWER SUPPLY GAMMA PROTECTION APPARATUS

[75] Inventor: Richard J. Logan, St. Petersburg, Fla.

[73] Assignee: Honeywell Inc., Morristown, N.J.

[21] Appl. No.: 09/293,260

[22] Filed: Apr. 16, 1999

[51] Int. Cl.[7] .................................................. H02M 3/335
[52] U.S. Cl. ................................ 363/21; 363/95; 363/132
[58] Field of Search ................................. 363/20, 21, 95, 363/131, 132, 40, 41

[56] References Cited

U.S. PATENT DOCUMENTS 4,661,896  4/1987  Kobayashi et al. ..................... 363/24
5,371,754  12/1994 Berndt et al. ............................ 372/38
5,416,584  5/1995  Kay .......................................... 356/350
5,687,067  11/1997 Majid et al. ............................. 363/97

*Primary Examiner*—Adolf Deneke Berhane
*Attorney, Agent, or Firm*—Albert K. Kau

[57] ABSTRACT

A voltage source supplies power to a ring laser gyro and includes a pulse width modulator that charges an output capacitor network. An apparatus connected to the pulse width modulator assumes control so that the pulse width modulator continues to produce output pulses despite exposure to radiation.

11 Claims, 5 Drawing Sheets

POWER SUPPLY GAMMA PROTECTION APPARATUS

BACKGROUND OF THE INVENTION

Currently, inertial guidance sensors operate in many flying aircraft for guidance of the aircraft. Ring laser gyros are used as inertial guidance sensors in aircraft as well as ships, submarines, satellites, missiles and other vehicles. However, when the vehicle enters a radiation environment, the radiation affects the sensor and hampers the operation of the sensor and as a result, guidance is hampered. Specifically in ring laser gyros, the laser discharge that keeps the ring laser gyro operating must remain ionized for the operation of the gyro to be maintained. Proper operation of the ring laser gyro requires that the laser discharge not be extinguished when the ring laser gyro is exposed to a radiation environment. The laser discharge is maintained by a high voltage power supply whose operation can be interrupted by the radiation environment. Specifically, a prompt gamma ray pulse can cause the high voltage power supply voltage to fall below the value required to maintain the laser discharge. When this happens, the vehicle being guided by the ring laser gyro can go off its planned course and be prevented from accomplishing its mission.

High voltage power supplies that use pulse width modulators to produce the required high voltage are susceptible to prompt gamma pulse upsets that reduce the high voltage below the level required to maintain lasing in the ring laser gyro. This occurs when the prompt gamma pulse turns off circuits internal to the pulse width modulator, specifically turning off an error amplifier used to determine the duration of the pulse width modulator output pulses which decreases voltage supplied and interrupts ring laser gyro operation.

FIG. 1 shows the effect on the high voltage supply output voltage of a simulated prompt gamma ray pulse. The prompt gamma ray pulse was simulated using a flash x-ray radiation source. As can be seen, the radiation pulse reduced the high voltage output below the level required to maintain the laser discharge (this voltage is about 450V for this experiment). Once the laser discharge is extinguished, it is not easy to re-initiate and the vehicle that depends on the ring laser gyro for navigation information is essentially blind and out of control until the discharge is re-initiated. Current methods used to maintain the laser discharge rely on expensive radiation hardened components. However, the radiation hardening techniques have not been shown to prevent dose rate: induced upsets of internal components. It would be beneficial to maintain the power supply output at acceptable levels so that operation of the ring laser gyro is not interrupted. It would be beneficial to have a less expensive means to maintain the power supply as well.

SUMMARY OF THE INVENTION

A voltage supply incorporating a pulse width modulator is used to initiate and maintain a laser discharge. The pulse width modulator periodically charges capacitors that maintain the laser discharge voltage. A feedback loop senses the voltage on the capacitors and adjusts the output of the pulse width modulator to maintain the voltage on the capacitors at the desired value. An apparatus connected to the pulse width modulator assumes control of the pulse width modulator when the feedback loop is disabled due to exposure to radiation.

DETAILED DESCRIPTION OF THE PRESENT INVENTION

The present invention prevents interruption of a ring laser gyro when the ring laser gyro is exposed to prompt ionizing radiation. It is to be understood that the present invention is a power supply that continues to operate despite exposure to radiation and one of its applications is for ring laser gyros, but actually can be used for an application requiring a power supply in a radiation environment. As stated in the background of the invention, previously, a prompt gamma ray pulse has been shown to turn off an error amplifier internal to the pulse width modulator 4. The error amplifier produces an output voltage that is proportional to the difference between a voltage reference internal to the pulse width modulator 4 and the voltage returned by the feedback loop. When the error amplifier is turned off, the pulse width modulator 4 produces no output pulses, allowing the voltage on the capacitors to decrease below a value required to maintain the laser discharge in the ring laser gyro and thus, disrupting the operation of the ring laser gyro. Attaching the circuit 2 of the present invention forces the output of the pulse width modulator 4 to a 100% duty cycle whenever the internal error amplifier is turned off which allows voltage on the capacitors to be maintained at the level required to maintain the laser discharge of the ring laser gyro.

Figure 1:
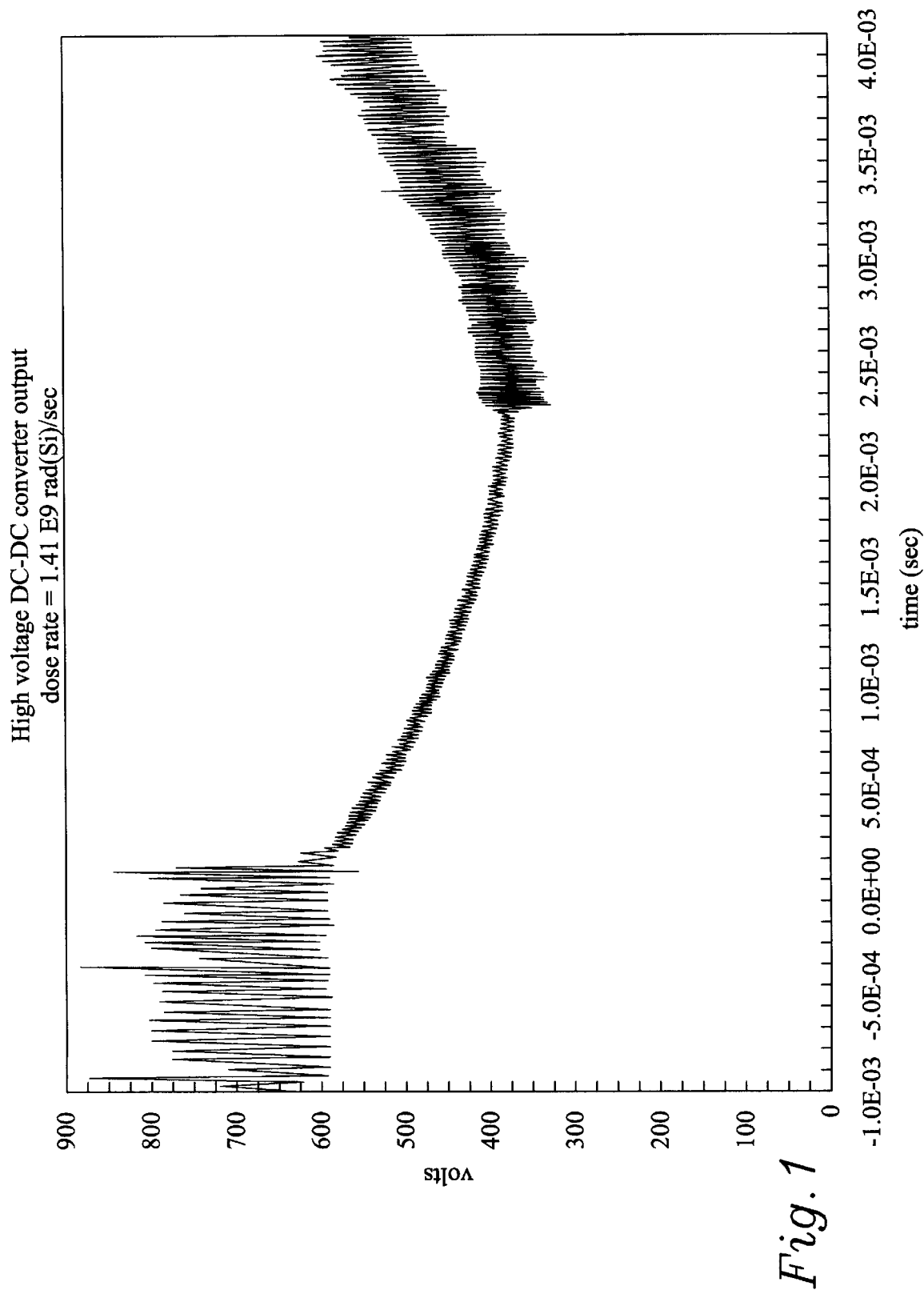
FIG. 1 shows a chart of existing methods of supplying voltage when exposed to radiation.
Figure 2:
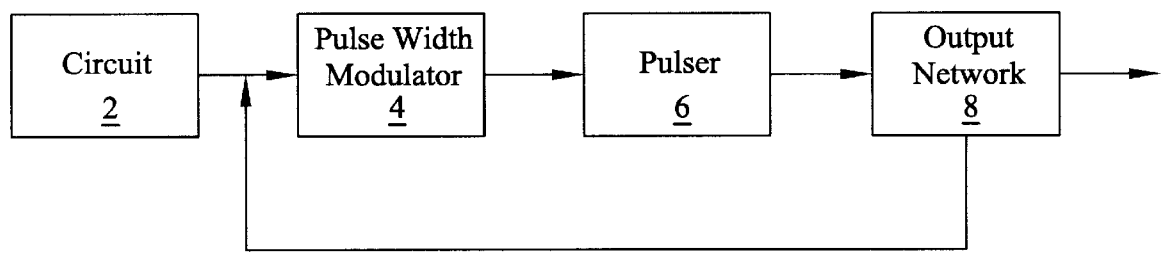
FIG. 2 shows a block diagram of the present invention.

FIG. 2 shows a block diagram of the invention. The present invention 2 is connected to the Pulse Width Modulator (PWM) 4. The pulse width modulator 4 controls a pulser 6 which supplies high voltage to the ring laser gyro. The pulse width modulator 4 controls the pulser 6 by sending voltage pulses of various pulse widths to the pulser 6. Feedback from the output network 8 to pulse width modulator 4 causes the pulse width modulator 4 to adjust the width of the control pulses to the pulser 6 and maintain the output voltage at a predetermined value. The present invention 2 specifically is a circuit that forces the pulse width modulator 4 to produce output pulses during radiation exposures. During radiation exposures, the feedback between the output network 8 and pulse width modulator 4 is disabled, causing the high voltage required to operate the ring laser gyro to be lost. The present invention 2 forces the pulse width modulator 4 to produce output pulses and thus maintain the voltage required to sustain the laser discharge in the ring laser gyro.

Figure 3A:
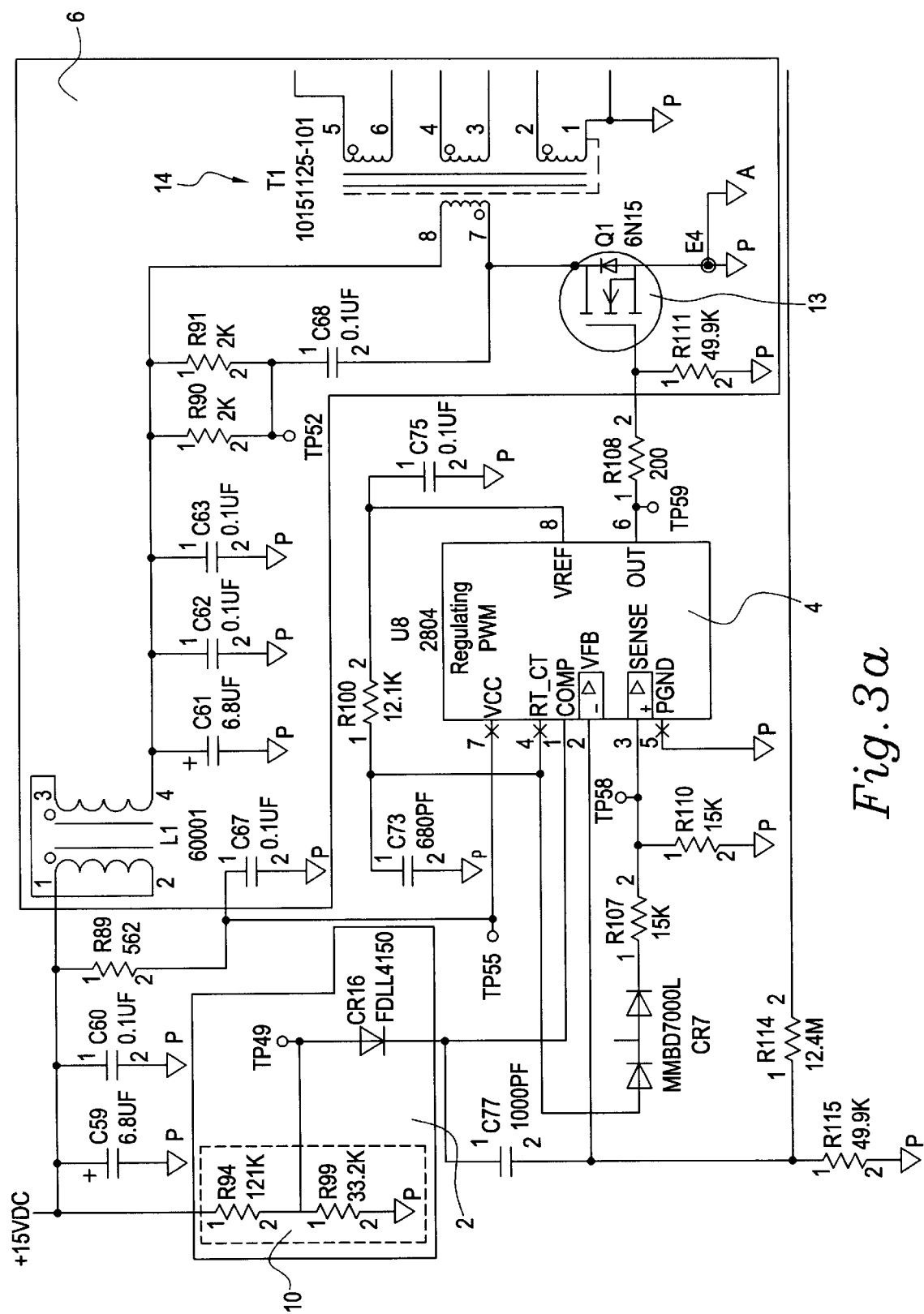
FIG. 3 shows a circuit diagram of the present invention.
Figure 3B:
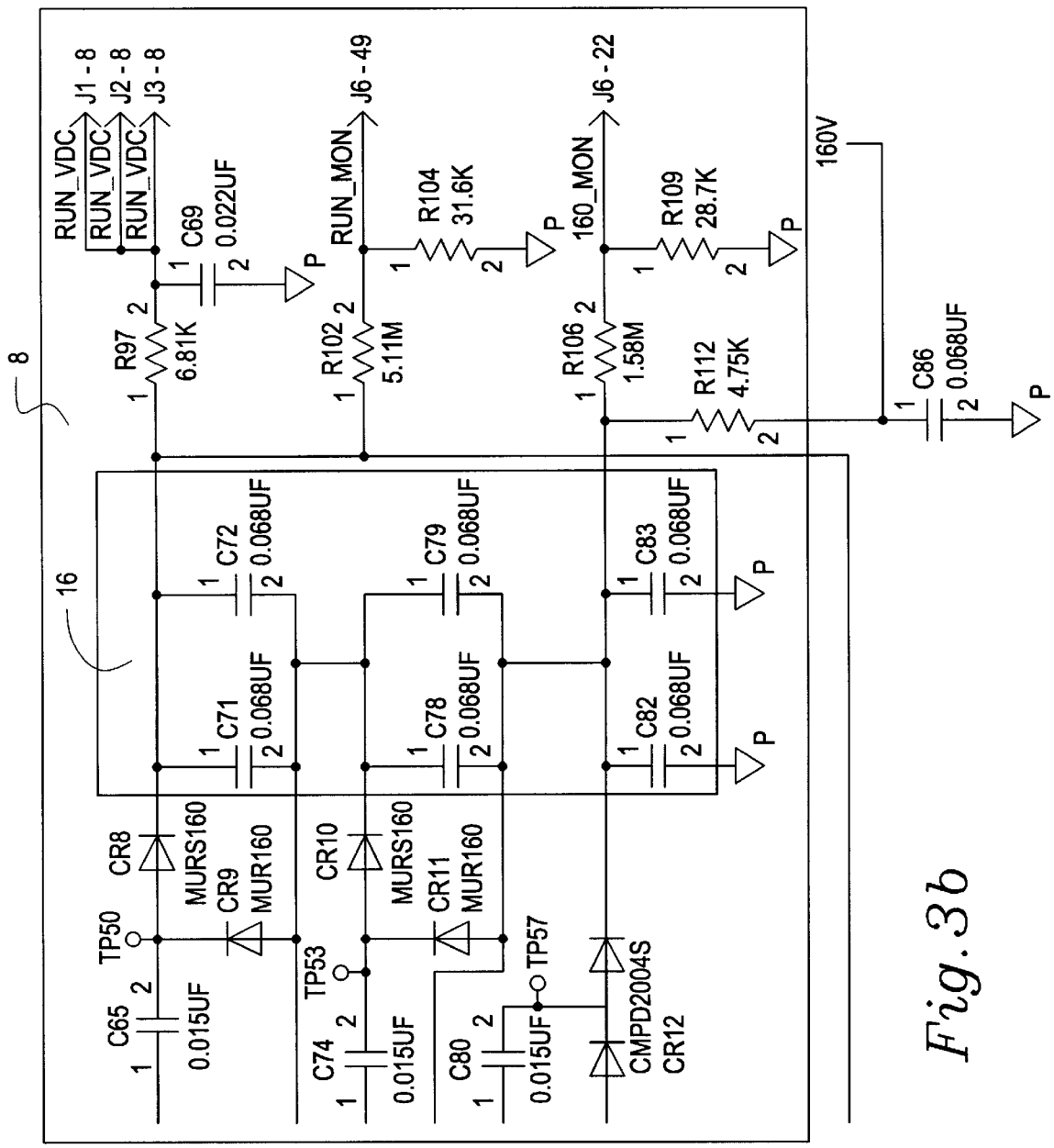
Figure 4:
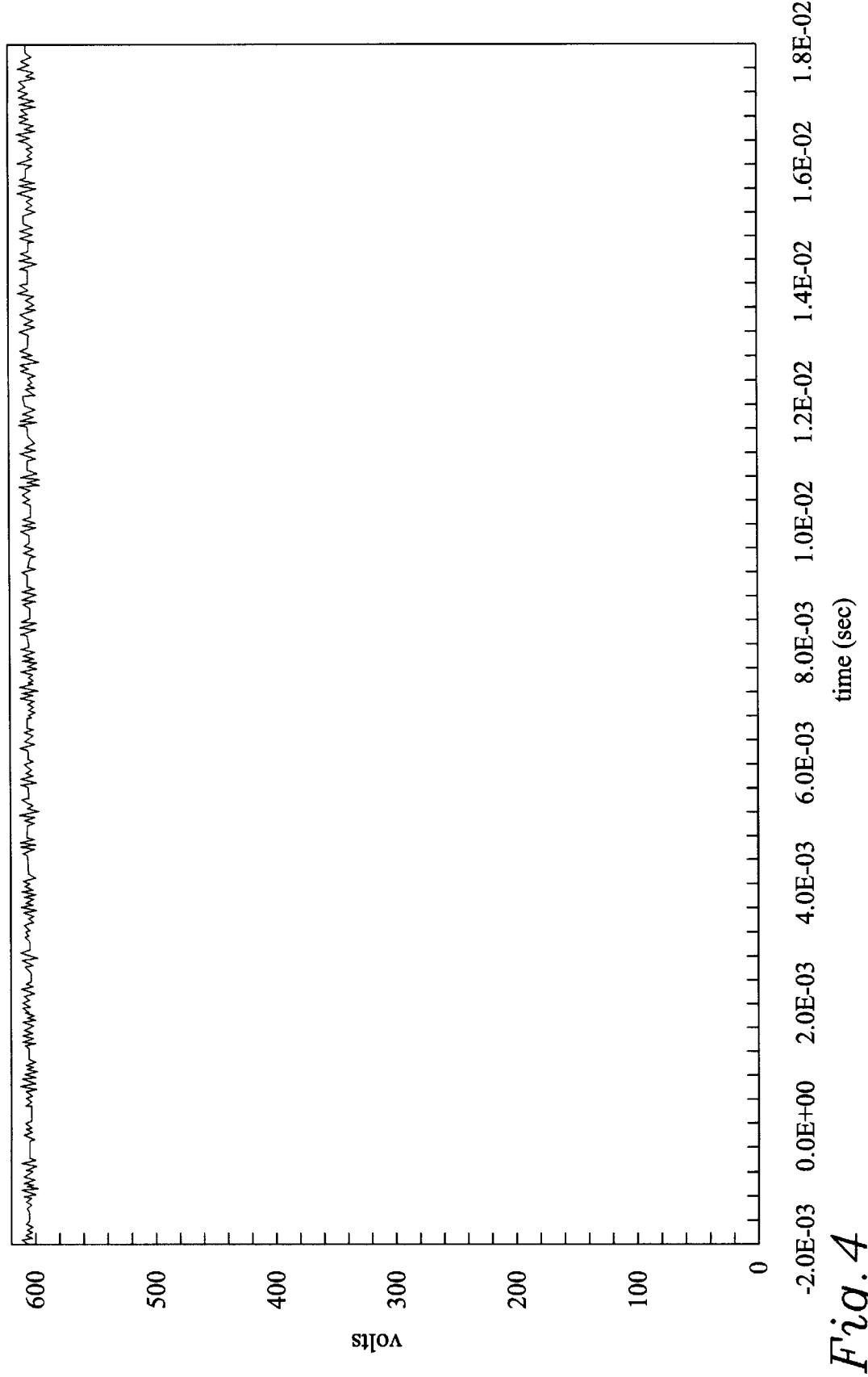
FIG. 4 shows a chart of the supply of voltage when radiation exposure occurs using the present invention.

A detailed circuit diagram of the present invention is shown in FIG. 3. The circuit of the present invention is specifically a voltage divider 10 and a signal diode 12. The anode of the diode 12 is connected to the output of the voltage divider 10. The cathode of the diode 12 is connected to a pin connected to the internal error amplifier of the pulse width modulator 4. The voltage divider 10 must maintain a reverse bias across the diode to prevent the diode 12 from interfering with signals on the pin during normal operation when no radiation exposure exists. When the amplifier fails due to radiation, the diode 12 becomes forward biased and current will then be supplied from the circuit of the present invention 2. The pulse width modulator 4, controls the gate of field effect transistor (Q1) 13 causing current to flow through transformer (T1) 14. The pulse width modulator 4 controls the gate of the field effect transistor (Q1) 13 by sending voltage pulses of various pulse widths to the gate of the field effect transistor (Q1) 13. Current flowing into the transformer (T1) 14 charges the capacitors 16 in the output network 8 which supplies high voltage to the ring laser gyro. FIG. 4 shows the difference with the use of the present invention. When the radiation is exposed as before, there is no change in the voltage supplied to the ring laser gyro. Again, the circuit of the present invention has the effect of commanding a duty cycle to 100% during a radiation event and successfully prevents radiation induced transients on the power supply output.

The invention has been described herein in detail in order to comply with the Patent Statutes and to provide those skilled in the art with the information needed to apply the novel principles and to construct and use such specialized materials and components as are required. However, it is to be understood that the invention can be carried out by specifically different materials and components, and that various modifications, both as to the processing details and operating procedures, can be accomplished without departing from the scope of the invention itself.

The embodiments of the invention in which an exclusive property or right is claimed are defined as follows:

1. A voltage power supply resistant to the effects of radiation, comprising:
   a first output network producing a voltage;
   a pulse width modulator controlling the voltage of the output network; and
   apparatus, connected to the power supply, for maintaining operation of the power supply during and after exposure to radiation.

2. The voltage power supply of claim 1 wherein the power supply, comprises:
   a second output network supplying power in the form of a voltage; and
   a pulse width modulator supplying current to the second output network in the form of pulses.

3. The voltage power supply of claim 1 wherein the apparatus, comprises:
   a voltage source; and
   a diode.

4. The voltage power supply of claim 3 wherein the voltage source maintains a reverse bias across a diode connected to an output of the pulse width modulator during normal operation of the pulse width modulator.

5. A power supply resistant to the effects of radiation, comprising:
   an output apparatus to output power;
   a voltage supply which supplies power to the output apparatus in the form of voltage;
   a pulse width modulator to control the voltage supply wherein control is in the form of pulses; and
   apparatus for assuming control of the pulse width modulator when radiation exposure occurs.

6. The power supply of claim 5 wherein the apparatus, comprises:
   a voltage divider circuit; and
   a diode.

7. The power supply of claim 6 wherein the voltage divider circuit has an impedance greater than the impedance of the pulse width modulator.

8. The power supply of claim 6 wherein the voltage divider circuit has an impedance less than the impedance of the pulse width modulator when exposure to radiation occurs.

9. The power supply of claim 5 wherein the output indicates to the pulse width modulator to increase output of the pulse width modulator when an increase in power is required.

10. A high voltage power supply, comprising:
    a pulse width modulator; and
    apparatus, connected to the pulse width modulator, for maintaining operation of the pulse width modulator during and after exposure to radiation.

11. The high voltage power supply of claim 1 wherein the power supply comprises:
    a pulse width modulator that controls a switch, the form of the control being voltage pulses of variable time duration;
    a switch that controls current through a transformer;
    an output network that is charged to a given voltage by current flowing in the transformer; and
    a feedback network that returns a portion of the output voltage to the pulse width modulator, the pulse width modulator adjusts the time duration of the output pulses according to the value of the output voltage fed back to the pulse width modulator by the feedback network.

* * * * *

UNITED STATES PATENT AND TRADEMARK OFFICE
CERTIFICATE OF CORRECTION

PATENT NO. : 6,130,827
DATED : October 10, 2000
INVENTOR(S) : Richard J. Logan

It is certified that error appears in the above-identified patent and that said Letters Patent is hereby corrected as shown below:

Column 1, line 2 insert:

The U.S. Government has certain rights in this invention pursuant to Contract No. N00024-97-C-5357, awarded by the Department of the Navy.

Signed and Sealed this

Eighth Day of May, 2001

Attest:

NICHOLAS P. GODICI

*Attesting Officer*  *Acting Director of the United States Patent and Trademark Office*